United States Patent [19]
Flenniken et al.

[11] Patent Number: 5,747,563
[45] Date of Patent: May 5, 1998

[54] POLYETHYLENE GLYCOL TREATED CARBON BLACK AND COMPOUNDS THEREOF

[75] Inventors: Cindy L. Flenniken, Indianapolis, Ind.; Jameel Menashi; Robert S. Whitehouse, both of Lexington, Mass.

[73] Assignee: Cabot Corporation, Boston, Mass.

[21] Appl. No.: 885,855

[22] Filed: Jun. 30, 1997

Related U.S. Application Data

[63] Continuation of Ser. No. 406,525, Mar. 20, 1995, abandoned.

[51] Int. Cl.$^6$ .................... C08K 9/04; C08K 5/06; C08K 3/04
[52] U.S. Cl. .................... 523/215; 524/377; 524/495; 524/496
[58] Field of Search .................... 523/215; 524/377, 524/386, 388, 495, 496

[56] References Cited

U.S. PATENT DOCUMENTS

| | | | |
|---|---|---|---|
| 2,065,371 | 12/1936 | Glaxner | 23/314 |
| 2,427,238 | 9/1947 | Swart | 524/575.5 |
| 2,457,962 | 2/1949 | Whaley | 524/496 |
| 2,511,901 | 6/1950 | Bunn | 264/117 |
| 2,635,057 | 4/1953 | Jordan | 106/477 |
| 2,639,225 | 5/1953 | Venuto | 106/477 |
| 2,850,403 | 9/1958 | Day et al. | 106/472 |
| 2,908,586 | 10/1959 | Braendle et al. | 106/476 |
| 3,011,902 | 12/1961 | Jordan et al. | 106/477 |
| 3,014,810 | 12/1961 | Dybalski et al. | 106/453 |
| 3,206,419 | 9/1965 | Pritchard et al. | 524/377 |
| 3,361,702 | 1/1968 | Wartman et al. | 524/387 |
| 3,565,658 | 2/1971 | Frazier et al. | 106/476 |
| 3,645,765 | 2/1972 | Frazier et al. | 106/477 |
| 3,671,476 | 6/1972 | Terai et al. | 524/423 |
| 3,844,809 | 10/1974 | Murray | 106/475 |
| 3,936,170 | 2/1976 | Shibano et al. | 335/271 |
| 4,013,622 | 3/1977 | DeJuneas et al. | 524/388 |
| 4,102,967 | 7/1978 | Vanderveen et al. | 264/113 |
| 4,230,501 | 10/1980 | Howard et al. | 524/275 |
| 4,305,849 | 12/1981 | Kawasaki et al. | 252/567 |
| 4,342,880 | 8/1982 | Castelli et al. | 174/36 |
| 4,397,652 | 8/1983 | Neumann | 252/301.21 |
| 4,440,671 | 4/1984 | Turbett | 524/258 |
| 4,440,807 | 4/1984 | Gunnell | 428/407 |
| 4,569,834 | 2/1986 | West et al. | 423/268 |
| 4,612,139 | 9/1986 | Kawasaki et al. | 252/511 |
| 4,812,505 | 3/1989 | Topcik | 524/377 |
| 4,857,232 | 8/1989 | Burns, Jr. | 524/495 |
| 5,168,012 | 12/1992 | Watson et al. | 428/408 |
| 5,288,532 | 2/1994 | Juhl et al. | 428/35.2 |
| 5,397,807 | 3/1995 | Hitchcock et al. | 523/215 |

FOREIGN PATENT DOCUMENTS

| | | | |
|---|---|---|---|
| 0 375 828 | 7/1990 | European Pat. Off. | |
| 2459815 | 2/1981 | France | 524/495 |
| 27 23 488 | 11/1978 | Germany | |
| 52-130481 | 11/1977 | Japan | |
| 0018749 | 1/1982 | Japan | 524/377 |
| 0002752 | 1/1986 | Japan | 524/495 |
| 61-181859 | 8/1986 | Japan | |
| 61-181860 | 8/1986 | Japan | |
| 0160850 | 6/1990 | Japan | 524/495 |
| 0137147 | 6/1991 | Japan | 524/495 |
| 0247641 | 11/1991 | Japan | 524/495 |
| 0011664 | 1/1992 | Japan | 106/476 |
| 0272944 | 9/1992 | Japan | 524/377 |
| 0446159 | 10/1974 | U.S.S.R. | 524/377 |
| 937492 | 6/1982 | U.S.S.R. | |
| 1756324 | 8/1992 | U.S.S.R. | 524/496 |
| 975847 | 11/1964 | United Kingdom | |
| 1605005 | 12/1981 | United Kingdom | 524/495 |

OTHER PUBLICATIONS

M. Kabbaj, Internal Technical Report of Cabot Corporation dated Apr. 13, 1981.
Hawley's Condensed Chemical Dictionary pp. 791, 792.
Chambers Science and Technology Dictionary p. 582.
Grant and Hackh's Chemical Dictionary p. 375.

*Primary Examiner*—Peter A. Szekely
*Attorney, Agent, or Firm*—James A. Cairns

[57] ABSTRACT

A treated carbon black may be produced by treating carbon black with at least one polyethylene glycol having a molecular weight of from about 1,000 to about 1,000,000. The treated carbon black may be used in forming polymeric compositions, such as semi-conductive and insulating compounds, for example for use in electrical cables.

26 Claims, 1 Drawing Sheet

5,747,563

POLYETHYLENE GLYCOL TREATED CARBON BLACK AND COMPOUNDS THEREOF

This is a continuation of application Ser. No. 08/406,525 filed Mar. 20, 1995, now abandoned.

BACKGROUND OF THE INVENTION

This invention relates to treated carbon black, suitable for use as semi-conductive compositions such as in electrical cables. More particularly, the present invention relates to carbon black treated with a polyethylene glycol, also known as a homopolymer of ethylene oxide, and to semi-conductive compositions including, for example, a polyolefin and the treated carbon black. Such treated carbon blacks are free-flowing, produce low dust levels, are attrition-resistant, are easily dispersible in polymeric systems and provide enhanced rheological, mechanical and electrical properties. The present invention also relates to a process for producing such treated carbon blacks, and compositions produced therefrom.

Any of a wide variety of carbon blacks may be used in the present invention. Thus the term carbon black is used herein in its generic sense to include types of finely divided carbon such as lamp black, channel black, furnace black, acetylene black and the like. Preferably, the carbon black is in the fluffy form. Although the carbon blacks are easily dispersed in liquid and polymeric systems in their fluffy forms, they are extremely difficult to handle with respect to conveying and accurate weighing. This is particularly due to their low bulk densities and generally high dust levels, which tend to lead to compaction and consequent irregular feed in continuous compounding operations. Such effects are undesirable because, for example, continuous compounding operations are desirable for wire and cable compounds as a means to ensure uniformity and cleanliness of the compounds.

A persistent problem with carbon black has been the relative difficulty and inconvenience associated with manufacturing, transporting and using the carbon black. When the carbon black is packaged, transported and removed from its packaging, carbon black dust is produced.

To improve the handling characteristics of the fluffy carbon blacks, they are generally agglomerated by various mechanical processes to produce pellets, either in the dry state or with the aid of a liquid pelletizing aid. Generally the carbon black particles are held together by weak forces. The most common process is to pelletize the fluffy carbon blacks using a liquid pelletizing aid such as oil or water. However, the agglomeration or densification process has been found to have a detrimental effect on the dispersion characteristics of the fluffy carbon blacks. That is, as the fluffy carbon blacks are agglomerated into pellets, they become less easily dispersible in polymeric systems. Therefore, there exists a tradeoff between acceptable handling characteristics and ease of dispersion.

In order to compound well dispersed formulations with these carbon blacks, they are often pelletized with materials such as sodium ligno sulfonate, water, sucrose, etc., as described below. However, the pelletizing aids often produce less than adequate results, or result in the carbon black being incompatible with the formulation in which it is to be combined. For example, some carbon blacks do not develop adequate pellet strength when pelletized with water. This is due to the very low van der Waals forces existing between the carbon structure. Thus, although in pellet form, they are quite friable and result in high dust levels. The result is inconsistent feed and consequent inhomogeneous dispersion in a compound.

Processes for pelletizing carbon blacks to produce carbon black pellets are known in the art. For example, U.S. Pat. No. 2,065,371 to Glaxner describes a wet pelletization process whereby the fluffy carbon black and a liquid such as water are combined and agitated until spherical carbon black beads are formed. The beads are then dried to reduce the water content to below 1% to form carbon black pellets.

In addition to water, a wide variety of binder additives are known to be useful in the wet pelletization process to further improve the pellet handling characteristics of the fluffy carbon blacks. For example, the following references describe the use of various binder additives as pelletizing aids for producing carbon blacks: U.S. Pat. No. 2,427,238 to Swart describes the use of a number of hygroscopic organic liquids or solutions, including ethylene glycol, in the compounding of rubber-like materials. U.S. Pat. No. 2,850,403 to Day discloses the use of carbohydrates such as sugar, molasses, soluble starches, saccharides and lignin derivatives as pelletization binder additives in the range of 0.1% to 0.4% by weight of the dry carbon black. The wet pellets are then dried for a given residence time at a temperature of from 150° C. to 425° C. to carbonize the carbohydrate binder. U.S. Pat. No. 2,908,586 to Braendle et al. discloses the use of a rosin emulsion as an alternative to the carbohydrates, in a preferred amount of from 0.5% to 2.0% by weight of the dry carbon black. U.S. Pat. No. 2,639,225 to Venuto discloses the use of sulfonate and sulfate anionic surfactants as pelletizing aids in an amount of 0.1% to 0.5% by weight of the dry carbon black. U.S. Pat. No. 3,565,658 to Frazier et al. discloses the use of a fatty amine ethoxylate nonionic surfactant as a pelletizing aid wherein the fatty amine ethoxylate has a level of ethoxylation in the range of from 2 to 50 moles of ethylene oxide per fatty amine group. The nonionic surfactant is disclosed as preferably being present in the range of 0.05% to 5.0%. Similarly, U.S. Pat. No. 3,645,765 also to Frazier et al. discloses the use of a fatty acid or rosin acid ethoxylate nonionic surfactant in the range of 0.1% to 10.0% by weight of the carbon black. The nonionic surfactant is disclosed as having a level of ethoxylation of from 5.0 to 15.0 moles of ethylene per acid group. Soviet Union Patent Publication No. 937,492 discloses the use of a 0.1% to 5.0% aqueous solution of a reaction product of urea and an ethoxylated alkylolamide, where the level of ethoxylation is from 1.0 to 7.0 moles of ethylene oxide per alkylolamide. Finally, U.S. Pat. No. 3,844,809 to Murray discloses the use of a nonionic surfactant containing randomly repeating poly(ethylene oxide) and poly(dimethyl silicone) groups. The reference discloses that 0.4% to 2.5% of an aqueous solution containing 0.001% to 0.1% of the nonionic surfactant results in a reduction in pellet dust levels. Molasses is also included at substantially higher concentrations of up to 2.0% as a co-binder, and nitric acid is included in an amount of up to 15.0% as an oxidizing source. The above patents disclose improved pellet handling qualities, but do not disclose changes in the performance properties of the pelletized carbon black in final product applications.

Among the handling characteristics of the carbon black that may be improved by binder additives and the level of such additives being used in the pelletizing process are such characteristics as adhesion, dispersibility, dispersion rate, viscosity stability and anti-static properties. For example, Japanese Patent Publication No. 01-201,369 discloses the use of a carboxylic acid type amphoteric surfactant in a concentration of from 0.001% to 0.1% in the pelletizing water to produce carbon black pellets with low adhesion and excellent dispersibility. U.S. Pat. No. 3,014,810 to Dybalski et al. discloses the benefits of wet pelletizing a range of pigments, including carbon black, with 0.05% to 5% by weight of a blend of a quaternary ammonium compound and a bis(2-hydroxyethyl)alkyl amine. The disclosed benefits include improvements in dispersion rate, viscosity stability and anti-static properties.

As described above, oil has also been used, with or without the inclusion of water, as a pelletizing aid. For example, U.S. Pat. No. 2,635,057 to Jordan, U.S. Pat. No. 3,011,902 to Jordan and U.S. Pat. No. 4,102,967 to Vanderveen et al. disclose the use of oil, such as mineral oil, in the pelletizing process to improve the handling characteristics of carbon black pellets. Additionally, the use of polymers in an emulsion, organic solvent, solution or molten form has been disclosed as a means of modifying the pellet properties of carbon black, for example as described in U.S. Pat. No. 2,511,901 to Bunn (latex emulsions), U.S. Pat. No. 2,457,962 to Whaley (aqueous emulsions or dispersions of rubber), U.S. Pat. No. 4,440,807 to Gunnell (molten rubber or a solution or emulsion of rubber), U.S. Pat. No. 4,569,834 to West et al. (emulsion of an oxidized polyethylene) and U.S. Pat. No. 5,168,012 to Watson et al. (a rubber latex) and in Japanese Patent Publication No. 77-130,481.

Other alternative pelletizing aids for producing carbon black pellets include sodium ligno sulfonates, silanes, sucrose, and nonionic dispersants such as alkyl succinimides and alkylated succinic esters. However, such alternatives have not produced favorable carbon black pellets and/or polymer compositions. For example, carbon blacks produced using sodium ligno sulfonates are generally considered unsuitable for use in semi-conductive polymer compositions due to the increased propensity for water tree formation resulting from the increased sulfur content. Other drawbacks of the alternative pelletizing aids include adhesion of the carbon blacks to processing equipment, difficulty in applying the pelletizing aids to the carbon blacks, and (particularly in wire and cable formulations) water tree formation in the polymer compositions.

The use of polyethylene glycol in the production of rubber and thermoplastic resin materials is also generally known. For example, U.S. Pat. No. 4,230,501 to Howard et al. describes the use of polyethylene glycol in a pigment concentrate that is easily dispersed in plastics. The polyethylene glycol or a hydrocarbon resin is incorporated as a viscosity control additive in a natural, petroleum or synthetic wax, which is then mixed with 51% to 85% by weight of a pigment to form a pigment concentrate. U.S. Pat. No. 4,397,652 to Neumann discloses the production of powdered compositions containing organic dyes and optical brighteners, that produce no negligible dust levels. Polyethylene glycol is disclosed both as an adhesive component, at molecular weights greater than 3,000, and as a dust-binding agent, at molecular weights between 200 and 1,000. British Patent Specification No. GB 975,847 discloses the use of an aqueous solution of polyethylene glycol or an aliphatic derivative as a means of producing agglomerates of organic rubber chemicals. Pellets of the composition are formed via an extrusion process, and subsequently dried at low temperatures.

Polyethylene glycol is also known in the art as an additive for direct compounding into crosslinked and thermoplastic resin compositions. For example, U.S. Pat. No. 4,013,622 to DeJuneas et al. describes the incorporation of 100 to 600 ppm of polyethylene glycol having a molecular weight of from 600 to 20,000 into a major amount of low density polyethylene. The polyethylene glycol is incorporated into the thermoplastic resin to reduce the breakdown of the polyethylene during blown film operations. As a further example, U.S. Pat. No. 3,361,702 to Wartman et al. discloses the use of polyethylene glycol or branched ethoxylate molecules as plasticizers for ethylene-acrylic acid co-polymers.

Polyethylene glycol is also known to be useful in the production of polymer compositions. For example, U.S. Pat. No. 4,812,505 to Topcik, U.S. Pat. No. 4,440,671 to Turbett and U.S. Pat. No. 4,305,849 to Kawasaki et al. disclose the use of polyethylene glycol, having a molecular weight of from 1,000 to 20,000, for reducing the water treeing characteristics in polymer compositions for electrical insulation materials. U.S. Pat. No. 4,812,505 to Topcik discloses incorporating from 0.1 to 20% by weight of polyethylene glycol into a polymer composition. U.S. Pat. No. 4,440,671 to Turbett discloses the incorporation of from about 0.2 to about 1 part of polyethylene glycol, having a molecular weight of from 1,000 to 20,000, per part by weight of diphenyl amine. U.S. Pat. No. 4,305,849 to Kawasaki et al. discloses the incorporation of between 0.3% and 10% by weight of polyethylene glycol directly into an insulating polymer composition by kneading the polyethylene glycol with the polymer.

In this respect, water treeing refers to a phenomenon that occurs when a polymeric insulation material such as polyolefin is subjected to an electrical field over a long period of time in an environment containing water. This phenomenon is to be distinguished from electrical trees (carbonization of the insulation material due to electrical discharges) and chemical trees (crystals formed from reactive gases on the conductor surface).

The reduction of the water treeing phenomenon is also addressed in U.S. Pat. No. 4,612,139 to Kawasaki et al., which is directed to reducing the water treeing problem in semi-conductive polymer compositions containing carbon black. The patent discloses that polyethylene glycol can be directly incorporated into a semi-conductive polymer composition to eliminate the water treeing phenomenon. Polyethylene glycol, having a molecular weight of from 1,000 to 20,000, is incorporated into the polymer in an amount of from 0.1% to 20% by weight of the polymer. Similar compositions are disclosed in German Patent No. DE 27 23 488. The German patent discloses that polyethylene glycol and other mobile additives are beneficial in reducing the interlaminar adhesion between the insulation layer and the outer conductive layer (e.g., the insulation shield) in an electrical cable construction.

Japanese Patent Publications Nos. 61-181,859 and 61-181,860 disclose electroconductive compositions. The compositions comprise a crystalline polyalkylene oxide and carbon black or graphite. 61-181,859 also discloses that the polymer is modified to contain carboxyl or carboxylic acid side chains.

SUMMARY OF THE INVENTION

The need continues to exist for improved pelletizing aids for use in the production of carbon black pellets wherein both the handling characteristics of the pellets and the performance characteristics of the polymer compositions in which the pellets are incorporated are improved. We have discovered that treating carbon black, preferably in fluffy form, with a polyethylene glycol compound as a pelletizing aid produces treated carbon black pellets having such improved handling and performance characteristics.

The need also continues to exist for improved compositions for the production of such articles as electrical wire and cable. Specifically, the need continues to exist for materials with improved performance characteristics. We have discovered that the aforementioned treated carbon black may be used to produce polymer compositions, such as semiconductive and insulating polyolefin compositions, having such improved performance characteristics.

Such improved treated carbon black and polymer compositions containing the treated carbon black with unique and novel properties, and processes for producing same, are provided herein.

Specifically, the present invention provides polymer compositions, such as a semi-conductive composition comprising a polyolefin homopolymer, copolymer or terpolymer and a carbon black treated with at least one polyethylene glycol having a molecular weight of from about 1,000 to about 1,000,000. As used herein, "molecular weight" refers to weight average molecular weight (Mw).

The present invention also provides pelletized carbon black wherein the carbon black pellets comprise carbon black treated with at least one polyethylene glycol having a molecular weight of from about 1,000 to about 1,000,000.

The present invention further provides a process for preparing such carbon black pellets, comprising treating a carbon black with at least one polyethylene glycol having a molecular weight of from about 1,000 to about 1,000,000, to produce the treated carbon black.

Polymer compositions incorporating the treated carbon blacks of the present invention may, for example, be used as semi-conductive layers bonded to primary insulation layers or electrical conductors, such as in electrical cables. For example, the polymer compositions may be used as insulation shield materials in the form of semi-conductive layers that may be easily stripped or removed from the insulation materials. These carbon blacks may also be used in strand filling compounds, either conductive or nonconductive, or in conductive or nonconductive cable jacketing formulations. Furthermore, these treated carbon blacks may be incorporated in minor amounts, without imparting semi-conductive properties to the composition, for example as a colorant in insulating compounds.

DETAILED DESCRIPTION OF PREFERRED EMBODIMENTS

Figure 1:
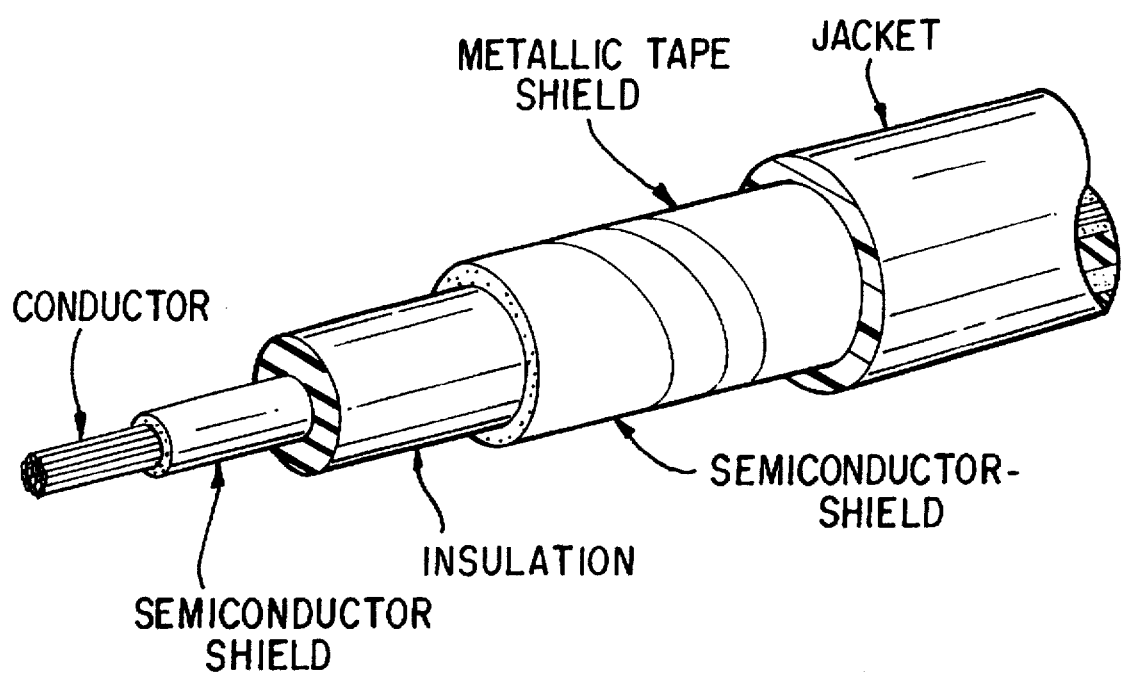
FIG. 1 is an illustration of a typical power cable.

Any of a wide variety of carbon blacks may be used in the present invention, including finely divided carbon such as lamp black, furnace black, and the like. Preferably, the carbon black is in the fluffy form.

In the process of the present invention, the carbon black, preferably in fluffy form, is treated with a polyethylene glycol having a molecular weight of from about 1,000 to about 1,000,000. In the present specification, the polyethylene glycol is referred to generally as a "polyethylene glycol compound" or simply as "polyethylene glycol." However, it is understood that the terminology also includes those polyethylene glycol compounds that are also referred to as homopolymers of ethylene oxide, and includes such compounds as result from condensation polymerization of ethylene glycol and addition polymerization of ethylene oxide. The term polyethylene glycol compounds thus encompasses those polymers having the repeating unit $(CH_2CH_2O)_n$. The polyethylene glycol compound may be added onto the carbon black as a pelletizing aid during formation of the carbon black pellets.

In the present invention, it is preferred that the polyethylene glycol have a molecular weight of from about 1,000 to about 1,000,000. More preferably, the polyethylene glycol has a molecular weight of from about 20,000 (preferably greater than 20,000) to about 1,000,000 and even more preferably from about 35,000 to about 100,000.

In the present invention, it is preferred that the polyethylene glycol compound be present in an amount of from about 0.1% to about 50% by weight of the carbon black. That is, with the polyethylene glycol compound being used as a pelletizing aid on the carbon black pellets, it is preferred that the polyethylene glycol compound be present in the treated carbon black in an amount of from about 0.1% to about 50% by weight. More preferably, the polyethylene glycol compound may be present in an amount of from about 0.1% to about 20%, and even more preferably in an amount of from about 1% to about 10% by weight of carbon black.

In preparing the treated carbon blacks, it may be preferable to form a solution containing the polyethylene glycol compound. If a solution of the polyethylene glycol compound is used, the solvent may be any of a wide variety of solvents capable of dissolving the polyethylene glycol compound. For example, the polyethylene glycol compound may be readily dissolved in water and/or a variety of organic solvents including, but not limited to, methanol, ethanol, isopropanol, carbon tetrachloride, trichloroethylene, benzene, toluene, xylene, acetone, mixtures thereof and the like. As to the solvent, it is more important that the polyethylene glycol compound be homogeneously dispersed or dissolved in the solvent, but the exact solvent utilized is generally not crucial. Preferably, however, the polyethylene glycol compound is used in an aqueous solution, especially as the molecular weight of the polyethylene glycol compound increases. On the basis of the instant disclosure, one skilled in the art will be able to readily select an appropriate solvent for the specific application.

Alternatively, the polyethylene glycol compound may be heated to a temperature above the melting point of the compound where the viscosity of the molten compound is such as to facilitate a spray application onto the carbon black. Here it is noted that many of the polyethylene glycol compounds are soluble in water at room temperature, and therefore little or no heating may be required. The viscosity of the molten compound, although not being limiting, is preferably below about 10 Poise. The temperature of the carbon black and the polyethylene glycol compound should be maintained above the melting point of the compound for sufficient time to allow for homogeneous mixing.

In embodiments of the present invention, the polyethylene glycol compound is used as a pelletizing aid to form carbon black pellets from the carbon blacks. The pelletization process generally comprises contacting the carbon black with a solution containing the polyethylene glycol compound and optionally selectively heating and drying the carbon black pellets.

The carbon black may be contacted with the polyethylene glycol compound by introducing the carbon blacks into a pelletizer apparatus with the polyethylene glycol compound. For example, the carbon black, preferably in fluffy form, may be introduced into the pelletizer with a solution of the polyethylene glycol compound. Examples of such pelletizing apparatus are known in the art, and include pin pelletizers. When the polyethylene glycol compound is introduced into the pelletizer apparatus in the form of a solution, for example in any of the above-described solvents, the concentration of the polyethylene glycol compound in the solvent is preferably in the range of from about 0.5% to about 35% by weight. However, the concentration of polyethylene glycol compound in the solvent, and the relative amount of solvent to carbon black, should be adjusted to ensure that the appropriate amount of polyethylene glycol compound is present on the carbon black particles, as described above.

After the carbon black has been contacted with the polyethylene glycol compound, the resultant wet carbon black pellets may optionally be heated at a controlled temperature and for a controlled length of time and/or at a reduced pressure to dry the pellets.

The treated carbon black of the present invention may be used to form a wide variety of compositions. For example, the treated carbon black may be used in forming pigment materials or may be combined with polymers and other optional components to form semi-conductive and insulating compositions, such as for use in electrical cables and electrical shielding. The semi-conductive compositions may be made by combining a polymer with an amount of carbon black sufficient to render the compositions semi-conductive. Similarly, the insulating materials may be formed by incorporating minor amounts of carbon black, for example as a colorant, into a polymer composition. Such insulating materials may be formed by combining a polymer and an amount of carbon black much less than that sufficient to impart semi-conductive properties to the material.

Specifically, the polymeric compositions in embodiments of the present invention may be made by combining a polymer such as a polyolefin with an amount of carbon black sufficient to render the compositions semi-conductive.

In preparing the polymer compositions of the present invention, the polymer may be selected from any of the various homopolymers, copolymers and terpolymers known in the art, the selection being based upon the ultimate desired use of the polymer composition. For example, the polymers used in the polymeric compositions of the present invention may include, but are not limited to, homopolymers, copolymers and graft polymers of ethylene where the co-monomers are selected from butene, hexene, propene, octene, vinyl acetate, acrylic acid, methacrylic acid, esters of acrylic acid, esters of methacrylic acid, maleic anhydride, half esters of maleic anhydride, carbon monoxide and the like; elastomers selected from natural rubber, polybutadiene, polyisoprene, random styrene butadiene rubber, polychloroprene, nitrile rubbers, ethylene propylene copolymers and terpolymers and the like; homopolymers and copolymers of styrene, including styrene-butadiene, styrene-butadiene-styrene linear and radial polymers, acrylonitrile-butadiene-styrene, styrene acrylonitrile and the like; linear and branched polyether or polyester polyols; crystalline and amorphous polyesters and polyamides; alkyd resins, rosin acids or rosin esters; hydrocarbon resins produced from thermal or Friedal Crafts polymerization of cyclic diene monomers such as dicyclopentadiene, indene, cumene and the like; ethylene/silane copolymers; ethylene/α-olefin/diene terpolymers such as ethylene/propylene/1,4-hexadiene, ethylene/1-butene/1,4-hexadiene and the like; and hydrocarbon oils such as paraffinnic oil, naphthalenic oil, hydrogenated naphthenic oil and the like; mixtures thereof and the like. Additionally, the polymer used in compositions of the present invention may include copolymers and terpolymers containing the above-identified polymers as major components of the copolymer or terpolymer.

Preferably, the polymer used in the compositions of the present invention includes ethylene-vinyl acetate, ethylene butene such as ethylene/1-butene, ethylene octene, ethylene ethyl acrylate, ethylene acrylic acid, equivalents thereto, mixtures thereof and the like.

The precise monomer content of the polymers used in the present invention will depend upon such factors as economic considerations and the desired applications of the resultant composition. In the case of using a polyolefin in forming the polymeric composition, typically the polymers used in compositions of the present invention will generally comprise in the range of from about 25 mole percent to about 98 mole percent ethylene, based on the total moles of monomer. Preferably, the polyolefin polymers comprise from about 30 mole percent to about 95 mole percent, and more preferably from about 35 mole percent to about 90 mole percent, ethylene. The other monomers, in the case of polyolefin copolymers, will comprise the balance of the polymer.

However, the ethylene content in the polymers may vary depending on the comonomer(s) present in the polymer. For example, in the case of an ethylene/vinyl acetate copolymer, it is preferred that the polymer comprise from about 15 mole percent to about 80 mole percent vinyl acetate. Preferably, the ethylene/vinyl acetate copolymer is of the rubbery variety, and accordingly has a vinyl acetate content of above about 28 mole percent. Even more preferably, the ethylene/vinyl acetate copolymer comprises from about 40 mole percent to about 60 mole percent vinyl acetate.

Additionally, the polymer, copolymer or terpolymer used in the polymeric formulations of the present invention may be either crosslinked or non-crosslinked. If the polymer is to be crosslinked, any of a wide variety of crosslinking agents such as those known in the art may be added to the formulation.

For example, a typical formulation of a polymeric composition for use in semi-conductive wire and cable applications of the present invention preferably comprises:

25–55% by weight of a carbon black treated with 0.5 to 10 parts of a polyethylene glycol per 100 parts of carbon black;

0–2% by weight of a stabilizer or antioxidant;

0–5% by weight of an organic peroxide, such as dicumyl peroxide;

0–10% by weight of a vinyl silane; and the remainder being a polymer or a blend of polymers.

The formulation may also include an additive polymer such as, for example, acrylonitrile butadiene elastomer containing, for example, 25–55% by weight acrylonitrile.

In the compositions of the present invention, the treated carbon black is generally present in the composition in the amount of from about 0.1 to about 65% by weight, and preferably from about 10 to about 50% by weight, based on the weight of the total composition. Such compositions generally possess semi-conductive properties. The content of the treated carbon black may be adjusted, of course, according to the desired use of the final composition and the desired relative conductivity of the composition. For example, carbon black may be incorporated into a polymer composition in smaller amounts to provide colored insulating materials or to improve the ultra-violet resistance of the compounds.

The compositions of the present invention may also include suitable additives for their known purposes and in known and effective amounts. For example, the compositions of the present invention may also include such additives as crosslinking agents, vulcanizing agents, stabilizers, pigments, dyes, colorants, metal deactivators, oil extenders, lubricants, inorganic fillers and the like.

For example, the polymer compositions of the present invention may include at least one crosslinking agent, preferably in an amount of from about 0.5 to about 5% by weight, based on the weight of the specific polymer being used. An organic peroxide is preferably used as a free radical generator and crosslinking agent. Useful organic peroxide crosslinking agents include, but are not limited to, α,α'-bis(tert-butylperoxy)-diisopropylbenzene, dicumyl peroxide, di(tert-butyl) peroxide, and 2,5-dimethyl-2,5-di(tert-butylperoxy)-hexane. Various other known coagents and crosslinking agents may also be used. For example, organic peroxide crosslinking agents are disclosed in U.S. Pat. No. 3,296,189, the entire disclosure of which is incorporated herein by reference.

As examples of antioxidants and processing aids that may be incorporated in the polymer compositions of the present invention, may be mentioned, for example, polymerized 1,2-dihydro-2,2,4-trimethylquinoline, octadecyl 3,5-ditert-butyl-4-hydroxyhydrocinnamate, 4,4'-thio-bis-(3-methyl-6-tert-butylphenol), thio-diethylene-bis-(3,5-ditert-butyl-4-hydroxy) hydrocinnamate, distearyl-thio-diproprionate, mixtures thereof and the like. Such antioxidants may be present in compositions of the present invention in an amount of preferably from about 0.4 to about 2.0% by weight, and more preferably from about 0.4 to about 0.75% by weight. Other suitable conventional antioxidants that may be used in compositions of the present invention include sterically hindered phenols, phosphites and selected amines.

Additionally, processing aids may be added to the polymeric formulations for their known purposes. Thus, although processing aids are not necessary to achieve homogeneous blends and reduced viscosity, they may be added into the compositions of the present invention to further enhance these properties. For example, the processing aids may include, but are not limited to, metal stearates such as zinc stearate and aluminum stearate, stearate salts, stearic acid, polysiloxanes, stearamide, ethylene-bisoleyamide, ethylene-bisstearamide, mixtures thereof and the like. Processing aids, when incorporated into compositions of the present invention, are generally used in amounts of from about 0.1 to about 5.0 percent by weight, based on the total weight of the polymer composition.

The polymer compositions of the present invention may be manufactured using conventional machinery and methods to produce the desired final polymer product. The compositions may be prepared by batch or continuous mixing processes such as those well known in the art. For example, equipment such as Banbury mixers, Buss co-kneaders, and twin screw extruders may be used to mix the ingredients of the formulation. For instance, the components of the polymer compositions of the present invention may be mixed and formed into pellets for future use in manufacturing such materials as insulated electrical conductors.

The polymer compositions of the present invention may be incorporated into any product where the properties of the polymer composition are suitable. For example, the polymer compositions are particularly useful for making insulated electrical conductors, such as electrical wires and power cables. Depending on the conductivity of the polymer composition, the polymer composition may be used, for example, as a semi-conductive material or as an insulating material in such wires and cables. More preferably, a semi-conductive shield of the polymer composition may be formed directly over an inner electrical conductor as a conductor shield, or over an insulating material as a bonded or strippable insulation shield or as an outer jacketing material. These carbon blacks in selected polymer compositions may also be used in strandfilling applications in either conductive or nonconductive formulations.

For ease of illustration, FIG. 1 depicts the typical components of an electrical cable. FIG. 1 shows a typical power cable comprising a conductive core (such as a multiplicity of conductive wires), surrounded by several protective layers. Additionally, the conductive core may contain a strandfiller with the conductive wires, such as a water blocking compound. The protective layers include a jacket layer, insulating layer, and semi-conductive shields.

When polyethylene glycol is used to treat the carbon blacks, a polymeric composition containing these treated carbon blacks exhibits properties that are unique and different from those observed when the polyethylene glycol is mixed directly into the polymeric composition. For example, in a polymeric formulation comprising a carbon black treated with polyethylene glycol, as compared to a polymeric formulation comprising a carbon black and polyethylene glycol mixed directly into the formulation, the differences described below may be observed. Here, these differences are noted for a polymeric composition comprising at least one polyolefin resin, an antioxidant, a curative agent, carbon black, and a polyethylene glycol compound either as an additive or as a treating compound for the carbon black.

Directly adding the polyethylene glycol compound to a polymeric formulation decreases the time to 50% cure and 90% cure ($t_c(50)$ and $t_c(90)$, respectively). Furthermore, direct addition of the polyethylene glycol compound depresses the scorch time ($t_s 2$) of the polymeric composition. Increasing the ratio of the polyethylene glycol compound additive further deteriorates these results. However, these changes are not observed in a polymeric composition comprising carbon black treated with the polyethylene glycol compound. The increased cure times and scorch time are preferable, for example, to prevent the product from scorching and curing prematurely and thus clogging the processing equipment or decreasing the output rates.

The volume resistivity of the polymeric compositions may also be unexpectedly affected by the use of the polyethylene glycol compound as a treating compound for carbon black. Specifically, there is an interaction of level of addition of the polyethylene glycol compounds as carbon black pellet aids. Increasing the level of polyethylene glycol compound in the treated carbon black significantly increases the volume resistivity of the polymeric composition over a broad temperature range in some polymeric systems, while decreasing the volume resistivity in other polymeric systems. Thus the volume resistivity effect is resin-dependent. Increasing the level of the polyethylene glycol compound used as a carbon black treating aid further enhances these results.

Use of the treated carbon blacks also affects the extruder viscosity during processing of the polymeric compositions. For example, use of the treated carbon blacks in high viscosity polymeric compositions significantly decreases the viscosity of the compositions, while maintaining output levels. Furthermore, as the shear rate is increased during processing, increased levels of the polyethylene glycol compound in the treated carbon blacks further decreases the viscosity while maintaining output levels. These results are superior to the results obtained by directly adding the polyethylene glycol compound to the formulation because decreased viscosity allows for increased output or constant output at decreased shear rates.

Moreover, the use of the polyethylene glycol compound as a treating compound for the carbon black is observed to significantly decrease adhesion of the polymeric composition to crosslinked polyethylene. This decreased adhesion is preferable, for example, because it increases the strippability of the polymeric composition from other compositions to which it is adhered. For example, decreased adhesion in the case of electrical cable allows for easier strippability of the semi-conductive shield from an underlying insulating material.

Based on the instant disclosure, one skilled in the art will recognize that the various components of the polymer compositions discussed above may be selected and adjusted as necessary to achieve specific end products with desirable performance characteristics. The invention will now be described in more detail with reference to specific preferred embodiments thereof, it being understood that these examples are intended to be illustrative only, and the invention is not intended to be limited to the materials, conditions, process parameters, etc. recited herein. All parts and percentages are by weight unless otherwise indicated.

EXAMPLES

Example 1

Polyethylene glycol-treated carbon black pellets are formed wherein the polyethylene glycol is used as a pelletizing aid in producing the carbon black pellets from carbon black in its fluffy form. In this example, the carbon black has a dibutyl phthalate absorption number (DBP) of 138 cc/100 g and an iodine surface area of 68 mg/g. Here, the DBP is measured according to ASTM D 2414 and the iodine surface area is measured according to ASTM D 1510. The carbon black is combined with an aqueous binder solution of polyethylene glycol (molecular weight=20,000) sufficient to yield a treated carbon black having 2% polyethylene glycol by weight of carbon black. The carbon black and aqueous binder solution are mixed in a continuous pin pelletizer operating with a rotor speed of 1,100 RPM and a mass flow rate ranging from 1,200 to 1,800 lbs/hr. The pellets are then dried in a heated rotating drum to provide carbon black pellets with a moisture content of below about 0.6%.

The thus-produced carbon black pellets are assessed for pellet strength according to ASTM D 1937. The carbon black pellets are also assessed for pellet attrition using a modified version of ASTM D 4324, which is modified to generate the level of dust after shaking samples of the carbon black pellets for five and twenty minutes. The results of these measurements are presented in Table 1 below.

Examples 2 and 3

Polyethylene glycol-treated carbon black pellets are prepared as in Example 1, except that the molecular weight of the polyethylene glycol contained in the aqueous binder solution is 35,000 (Example 2) and 100,000 (Example 3). The same pellet strength and pellet attrition measurements are made as in Example 1, and the results are presented in Table 1 below.

Comparative Example 1

Carbon black pellets are prepared according to Example 1, except that the binder solution consists only of water, i.e., does not contain polyethylene glycol. The same pellet strength and attrition measurements are made as in Example 1, and the results are presented in Table 1 below.

TABLE 1

| Example # | Molecular Weight of PEG | Pellet Strength (lbs) | Percent Dust After 5 Minutes | Percent Dust After 20 Minutes |
|---|---|---|---|---|
| 1 | 20,000 | 30.6 | 0.2 | 0.2 |
| 2 | 35,000 | 24.0 | 0.4 | 1.2 |
| 3 | 100,000 | 29.7 | 0.4 | 0.8 |
| Comp 1 | N/A | 15.6 | 5.2 | 7.6 |

Example 4

A semi-conductive compound is produced using the polyethylene glycol-treated carbon black pellets produced in Example 1 above. The carbon black pellets are compounded with an ethylene vinyl acetate resin using a ZSK twin screw extruder. The ethylene vinyl acetate resin has a melt index of 3 and contains 40% vinyl acetate by weight. The resultant compound is evaluated for melt viscosity (at a shear rate of 50 $s^{-1}$) and for microscopic dispersion of the carbon black. The microscopic dispersion of carbon black is evaluated by examining an extruded tape of the semi-conductive compound for surface imperfections with an optical microscope and a reflective light source. The area of the imperfection assigned to undispersed carbon black is related to the total area of tape examined. In this measurement, particles of dust and gel polymer are excluded. The results of these measurements are presented in Table 2 below.

Examples 5 and 6 and Comparative Example 2

Semi-conductive materials are prepared as in Example 4, incorporating the carbon black pellets from Examples 2 and 3 and comparative Example 1, to produce semi-conductive compounds for Examples 5 and 6 and comparative Example 2, respectively. The same measurements of melt viscosity and microscopic dispersion are made as in Example 4. The results are presented in Table 2 below.

TABLE 2

| Example # | Carbon Black Pellets | Viscosity Pa-sec | Undispersed Carbon Black % |
|---|---|---|---|
| 4 | Example 1 | 4,613 | 0.0175 |
| 5 | Example 2 | 4,679 | 0.0083 |
| 6 | Example 3 | 6,275 | 0.0186 |
| Comp 2 | Comparative 1 | 6,078 | 0.047 |

Example 7

The semi-conductive compound of Example 4 is evaluated for strippability onto a crosslinked polyethylene insulation compound. Into the semi-conductive compound of Example 4 is introduced 1% by weight of dicumyl peroxide, using a Brabender mixer. The temperature during processing is maintained below 150° C. to minimize decomposition of the peroxide. The material is then transferred to a heated hydraulic press, maintained at a temperature of 130° C., and plaques of 1.2 mm in thickness are produced. Plaques of polyethylene having a thickness of 2 mm and containing 1% dicumyl peroxide are also prepared in a similar manner. The two plaques are then laminated together under a pressure of 100 psi and exposed to a curing cycle of 180° C. for fifteen minutes. The bonded laminates are allowed to cool to a temperature below 100° C. under pressure. The delamination force under a peeling angle of 180 degrees and a separation speed of 3.94 inches/minute is recorded. The tests are conducted twenty-eight times, and the average peel force is provided in Table 3 below.

Examples 8 and 9 and Comparative Example 3

Similar to Example 7, Examples 8 and 9 and comparative Example 3 evaluate the strippability onto a crosslinked polyethylene insulation compound of the semi-conductive compounds produced in Examples 5 and 6 and comparative Example 2, respectively. The average peel force for each of the materials is presented in Table 3 below.

TABLE 3

| Example # | Conductive Composition | Peel Force lb/0.5 in. width |
|---|---|---|
| Example 7 | Example 4 | 4.46 ± 0.20 |
| Example 8 | Example 5 | 4.46 ± 0.14 |
| Example 9 | Example 6 | 4.39 ± 0.18 |
| Comparative 3 | Comparative 2 | 6.55 ± 0.46 |

Example 10

Polyethylene glycol-treated carbon black pellets are formed wherein the polyethylene glycol is used as a pelletizing aid in producing the carbon black pellets from carbon black in its fluffy form. In this example, the carbon black has a DBP of 143 cc/100 g and an iodine surface area of 129 mg/g. The carbon black is combined with an aqueous binder solution of polyethylene glycol (molecular weight=1,000) sufficient to yield a treated carbon black having 2% polyethylene glycol by weight of carbon black. The carbon black and aqueous binder solution are mixed in a continuous pin pelletizer operating with a rotor speed of 1,000 RPM and a mass flow rate of 850 lbs/hr. The pellets are collected and dried in a heated air circulating oven held at a temperature of 125° C. until the moisture content is reduced to below about 0.5%.

The thus-produced carbon black pellets are assessed for pellet strength and attrition resistance as described above. The results of these measurements are presented in Table 4 below.

Examples 11–14

Polyethylene glycol-treated carbon black pellets are prepared as in Example 10, except that the molecular weight of the polyethylene glycol contained in the aqueous binder solution is 8,000 (Example 11), 20,000 (Example 12), 35,000 (Example 13) and 100,000 (Example 14). In the case of Example 14, the binder solution contains the polyethylene glycol in an amount sufficient to yield a treated carbon black having 1% polyethylene glycol by weight of carbon black. The same pellet strength and pellet attrition measurements are made as in Example 10, and the results are presented in Table 4 below.

Comparative Example 4

Carbon black pellets are prepared according to Example 10, except that the binder solution consists only of water, i.e., does not contain polyethylene glycol. The same pellet strength and attrition measurements are made as in Example 10, and the results are presented in Table 4 below.

TABLE 4

| Example # | Molecular Weight of PEG | Pellet Strength (lbs) | Percent Dust After 5 Minutes | Percent Dust After 20 Minutes |
|---|---|---|---|---|
| 10 | 1,000 | 63.3 | 0.7 | 1.0 |
| 11 | 8,000 | 55.3 | 0.7 | 1.4 |
| 12 | 20,000 | 82.0 | 0.6 | 2.3 |
| 13 | 35,000 | 67.1 | 0.1 | 0.2 |
| 14 | 100,000 | 50.5 | 0.6 | 0.9 |
| Comp 4 | N/A | 44.1 | 2.9 | 9.6 |

Example 15

Semi-conductive compounds are produced using the polyethylene glycol-treated carbon black pellets produced in Example 10 above. The carbon black pellets are individually compounded with three different polymers using a Brabender mixer. The compounds contain 40% carbon black and 60% polymer by weight. The three polymers are (1) an ethylene vinyl acetate copolymer containing 40% vinyl acetate and having a melt index of 3; (2) an ethylene vinyl acetate copolymer containing 18% vinyl acetate and having a melt index of 2.5; and (3) an ethylene ethyl acrylate copolymer containing 18% ethyl acrylate and having a melt index of 3.4. The resultant compounds are evaluated for melt viscosity (at a shear rate of 50 s$^{-1}$ and 130° C.), as described above. The results of these measurements are presented in Table 5 below.

Examples 16–19 and Comparative Example 5

Semi-conductive materials are prepared as in Example 15, incorporating the carbon black pellets from Examples 11–14 and comparative Example 4, to produce semi-conductive compounds for Examples 16–19 and comparative Example 5, respectively. The same measurements of melt viscosity are made as in Example 15. The results are presented in Table 5 below.

TABLE 5

| | | Melt Viscosity | | |
|---|---|---|---|---|
| Example # | Carbon Black Pellets | Polymer 1 | Polymer 2 | Polymer 3 |
| 15 | Example 10 | 8,007 | 2,930 | 2,711 |
| 16 | Example 11 | 6,952 | 5,291 | 4,700 |
| 17 | Example 12 | 7,171 | 5,990 | 5,203 |
| 18 | Example 13 | 6,996 | 5,794 | 5,203 |
| 19 | Example 14 | 8,004 | 6,537 | 5,706 |
| Comp 5 | Comparative 4 | 8,155 | 7,368 | 7,018 |

Additionally, all of Examples 15–19 show that an addition of polyethylene glycol to treat the carbon black results in an improvement in carbon black dispersion.

Examples 20–36 And Comparative Example 6

Carbon black compounds suitable for pigmentary ultraviolet protection are prepared as follows.

Carbon black with a DBP of 145 cc/100 g and an iodine surface area of 70 mg/g are pelletized with various aqueous solutions of varying concentrations of polyethylene glycol in a pin pelletizer operating with a rotor speed of 1,050 RPM. In the case of Comparative Example 6, the carbon black is pelletized with a 100% aqueous solution, without any polyethylene glycol. The pellets are collected and dried in a heated air circulating oven held at a temperature of 125° C. until the moisture content is reduced to below about 0.5%. The pellets are evaluated for pellet strength according to ASTM D 1937 and pellet attrition according to the modified version of ASTM D 4324, as in Example 1. The results are presented in Table 6.

Several of the carbon black pellets are then compounded with low density polyethylene, having a melt index of 26, to produce a 40% pigment masterbatch. The polyethylene compounds are then assessed for melt viscosity at 130° C. and a shear rate of 50 s$^{-1}$. The results are presented in Table 6.

TABLE 6

| Example # | Molecular Weight of PEG | % Content PEG | Pellet Strength (lbs) | Percent Dust 5 Min. | Percent Dust 10 Min. | Melt Viscosity (Pa) |
|---|---|---|---|---|---|---|
| Comp 6 | N/A | 0.0 | 44.1 | 2.9 | 9.6 | 5,116 |
| 20 | 1,000 | 0.5 | 69.1 | 0.70 | 1.42 | |
| 21 | 1,000 | 1.0 | 70.7 | 0.26 | 1.04 | |
| 22 | 1,000 | 2.0 | 55.3 | 0.74 | 1.38 | 2,908 |
| 23 | 1,000 | 4.0 | 72.1 | 0.44 | 0.50 | |
| 24 | 8,000 | 0.5 | 69.1 | 0.70 | 1.42 | |
| 25 | 8,000 | 1.0 | 70.7 | 0.26 | 1.04 | |
| 26 | 8,000 | 2.0 | 47.3 | 1.04 | 2.54 | 3,673 |
| 27 | 20,000 | 0.5 | 72.0 | 0.26 | 0.58 | |
| 28 | 20,000 | 1.0 | 78.9 | 0.26 | 0.34 | |
| 29 | 20,000 | 2.0 | 82.0 | 0.62 | 2.26 | 3,341 |
| 30 | 20,000 | 4.0 | 133.5 | 0.20 | 1.20 | |
| 31 | 35,000 | 0.5 | 66.0 | 0.34 | 0.72 | 5,004 |
| 32 | 35,000 | 1.0 | 63.6 | 0.36 | 1.78 | 3,784 |
| 33 | 35,000 | 2.0 | 67.1 | 0.08 | 0.18 | 3,341 |
| 34 | 35,000 | 4.0 | 75.2 | 0.12 | 0.14 | |
| 35 | 100,000 | 0.5 | 66.3 | 0.34 | 0.54 | |
| 36 | 100,000 | 1.0 | 55.0 | 0.36 | 0.60 | 3,027 |

In all of Examples 20–36, the incorporation of polyethylene glycol contributes to improved pellet strength and higher attrition resistance. The results also appear to be independent of the molecular weight of the polyethylene glycol. The viscosity of the carbon black masterbatch is also lowered by the incorporation of polyethylene glycol as a binder material. The polyethylene glycol also allows for easier incorporation into an extruder film or profile where the final carbon black concentration is in the range of 0.5% to 4.0% depending on the final application.

Furthermore, samples of a composition with a 2.5% carbon black loading in low density polyethylene (LDPE) having a melt index of 0.7 are prepared to simulate a film application. A visual inspection of the samples indicate qualitatively an improvement in carbon black dispersion.

Examples 37–38 And Comparative Example 7

Carbon black compounds suitable for use as masterbatches are prepared.

Carbon black with a DBP of 135 cc/100 g and an iodine surface area of 180 mg/g are pelletized with various aqueous solutions of varying concentrations of polyethylene glycol in a pin pelletizer operating with a rotor speed of 1,100 RPM. The aqueous solutions of Examples 37 and 38 include polyethylene glycol (MW=35,000) sufficient to provide levels in the carbon black pellets of 2% and 16%, respectively. Comparative Example 7 uses a 100% aqueous solution. The pellets are collected and dried in a heated air circulating oven held at a temperature of 125° C. until the moisture content is reduced to below about 0.3%.

The dry carbon black pellets are then compounded with low density polyethylene, having a melt index of 26, to produce a masterbatch containing 40% carbon black by weight. The carbon black pellets and low density polyethylene are mixed in a Brabender mixer with an initial temperature of 115° C. and speed of 50 RPM. The polyethylene compounds are then measured for melt viscosity at 130° C. and a shear rate of 50 s$^{-1}$. The results are presented in Table 7.

TABLE 7

| Example # | Pellet Strength (lbs) | Percent Dust 5 Min. | Percent Dust 10 Min. | Melt Viscosity (Pa) |
|---|---|---|---|---|
| Comp 7 | 44 | 3.6 | 15.0 | 4,330 |
| 37 | 101 | 0.3 | 1.5 | 3,913 |
| 38 | 158 | 0.1 | 0.4 | 4,320 |

Examples 39–40 and Comparative Example 8

Compounds are prepared according to Examples 37–38 and Comparative Example 7, except that the carbon black feedstock has a DBP of 136 cc/100 g and an iodine surface area of 120 mg/g. The same masterbatch compositions are prepared and tested, with the results presented in Table 8.

TABLE 8

| Example # | Pellet Strength (lbs) | Percent Dust 5 Min. | Percent Dust 10 Min. | Melt Viscosity (Pa) |
|---|---|---|---|---|
| Comp 8 | 61.9 | 0.8 | 5.2 | 4,591 |
| 39 | 133 | 0.1 | 0.3 | 3,804 |
| 40 | 157 | 0.05 | 0.12 | 2,689 |

Examples 41–45

Polyethylene glycol treated carbon blacks are prepared as described in Example 1 above. The treated carbon blacks are prepared by using varying amounts of polyethylene glycol as a treating compound for the carbon black. Specifically, five carbon blacks are prepared using the following types and amounts of polyethylene glycol as a treating compound.

| Carbon Black # | Polyethylene Glycol Molecular Weight | Parts by Weight of Carbon Black |
|---|---|---|
| 1 | 20,000 | 2.0 |
| 2 | 20,000 | 4.0 |
| 3 | 35,000 | 2.0 |
| 4 | 35,000 | 3.0 |
| 5 | 100,000 | 2.0 |

Here it is also noted that the 100,000 molecular weight polyethylene glycol is also known as a polyethylene oxide compound.

Semi-conductive shields for use in preparing electrical cables are prepared by combining approximately 57 parts by weight of an ethylene/1-butene copolymer (15% butene content), about 41 parts by weight of one of the treated carbon blacks and about 1.5 parts by weight of other additives. The ethylene/1-butene copolymer has a melt index of 27, a density of 0.9 g/cm$^3$ and a molecular weight distribution (MWD) of 2.15. The additives include about 0.5% of any antioxidant (such as 1,2-dihydro-2,2,4-trimethylquinoline, octadecyl 3,5-ditert-butyl-4-hydroxyhydrocinnamate or a mixture thereof) and 1.0% of an organic peroxide curative α,α'-bis(tert-butylperoxy) diisopropylbenzene. The specific component ratios are as follows:

| Component | 41 | 42 | 43 | 44 | 45 |
|---|---|---|---|---|---|
| Ethylene/1-butene | 57.55 | 56.73 | 57.55 | 57.14 | 57.55 |
| Carbon Black # 1 | 40.95 | — | — | — | — |
| Carbon Black # 2 | — | 41.77 | — | — | — |
| Carbon Black # 3 | — | — | 40.95 | — | — |
| Carbon Black # 4 | — | — | — | 41.36 | — |
| Carbon Black # 5 | — | — | — | — | 40.95 |
| Antioxidant | 0.50 | 0.50 | 0.50 | 0.50 | 0.50 |
| Peroxide Curative | 1.00 | 1.00 | 1.00 | 1.00 | 1.00 |
| Total | 100.00 | 100.00 | 100.00 | 100.00 | 100.00 |

The components are mixed in a Banbury mixer or other suitable equipment.

The formulations are tested for various physical and electrical characteristics. Cure data is determined by measuring the torque (lb-in.) on plaques of the formulation with an Oscillating Disc Rheometer (ODR) operating to 400° F. and 3° arc. The low ($M_l$) and high ($M_h$) ODR torque values, scorch time ($t_s2$) and 50% ($t_c(50)$) and 90% ($t_c(90)$) cure times are presented in Table 10 below. The formulation is also evaluated for volume resistivity at various temperatures, tensile strength and elongation, and extrusion parameters on a Haake Rheocord. The results are presented in Table 9 below.

Comparative Examples 9–13

Semi-conductive shields for use in preparing electrical cables are prepared similar to those in Examples 41–45 above, except that the carbon black is an untreated carbon black. That is, the carbon black pellets are derived from carbon black pelletized with deionized water.

Semi-conductive shields for use in preparing electrical cables are prepared by combining approximately 57 parts by weight of an ethylene/1-butene copolymer (the same copolymer as used in Examples 41–45), about 41 parts by weight of the untreated carbon black, and about 1.5 parts by weight of other additives. The formulation additionally includes polyethylene glycol (PEG) added directly into the formulation. In these Comparative Examples, varying amounts of differing molecular weight polyethylene glycol are added to the formulations. The specific component ratios are as follows:

| Component | Comp 9 | Comp 10 | Comp 11 | Comp 12 | Comp 13 |
|---|---|---|---|---|---|
| Carbon Black | 40.13 | 40.13 | 40.13 | 40.13 | 40.13 |
| Ethylene/1-butene | 57.55 | 56.73 | 57.55 | 56.73 | 57.55 |
| 20,000 MW PEG | 0.82 | — | — | — | — |
| 20,000 MW PEG | — | 1.64 | — | — | — |
| 35,000 MW PEG | — | — | 0.82 | — | — |
| 35,000 MW PEG | — | — | — | 1.64 | — |
| 100,000 MW PEG | — | — | — | — | 0.82 |
| Antioxidant | 0.50 | 0.50 | 0.50 | 0.50 | 0.50 |
| Peroxide Curative | 1.00 | 1.00 | 1.00 | 1.00 | 1.00 |
| Total | 100.00 | 100.00 | 100.00 | 100.00 | 100.00 |

Here, all of the parts by weight are based on the weight of the total formulation. The components are mixed in a Banbury mixer or other suitable equipment as in Examples 41–45 above.

It is also noted here that the additives in Comparative Examples 9–13 are the same as those in Examples 41–45, and are present in the same amounts. Additionally, the amounts of polymer, carbon black and polyethylene glycol are the same in Examples 41–43 and 45, and Comparative Examples 9–11 and 13, respectively. It should be noted that in Example 44, the amount of polyethylene glycol used is 3% by weight of the carbon black and is used as a treating compound on the carbon black. Comparative Example 12 contains polyethylene glycol in an amount of 4% by weight of the carbon black and is added directly into the formulation. Furthermore, as noted above, the polyethylene glycol in Examples 41–45 is used to treat the carbon black, whereas in Comparative Examples 9–13 it is added directly to the formulation.

The same tests and measurements are conducted as in Examples 41–45, and the results are presented in Table 9.

TABLE 9

| | 41 | 42 | 43 | 44 | 45 | Comp 9 | Comp 10 | Comp 11 | Comp 12 | Comp 13 |
|---|---|---|---|---|---|---|---|---|---|---|
| ODR Measurements at 400° F. | | | | | | | | | | |
| $M_l$, lb-in. | 2.2 | 2.0 | 2.0 | 2.0 | 2.0 | 2.3 | 2.8 | 2.1 | 2.6 | 2.2 |
| $M_h$, lb-in. | 67.2 | 60.3 | 66.5 | 70.5 | 65.0 | 69.9 | 70.1 | 69.1 | 65.1 | 69.8 |
| $t_s2$, sec. | 55.3 | 54 | 57 | 54 | 52 | 59.7 | 53.6 | 56.6 | 52.3 | 50.3 |
| $t_c(50)$, sec. | 108.3 | 108 | 114 | 108 | 105 | 111 | 101.3 | 106 | 100.3 | 99 |
| $t_c(90)$, sec. | 160.3 | 167 | 173.7 | 162.3 | 149 | 157.7 | 146.3 | 149.3 | 146.6 | 143.7 |
| Volume Resistivity, ohm-cm | | | | | | | | | | |
| Room Temperature | 5 | 7 | 6 | 5 | 5 | 5 | 4 | 4 | 4 | 4 |
| 50° C. | 7 | 9 | 7 | 7 | 6 | 6 | 6 | 5 | 5 | 6 |
| 90° C. | 30 | 41 | 30 | 30 | 26 | 28 | 22 | 21 | 18 | 24 |
| 110° C. | 35 | 48 | 35 | 35 | 31 | 31 | 24 | 27 | 19 | 27 |
| 130° C. | 37 | 50 | 38 | 38 | 33 | 35 | 26 | 32 | 21 | 30 |

TABLE 9-continued

|  | 41 | 42 | 43 | 44 | 45 | Comp 9 | Comp 10 | Comp 11 | Comp 12 | Comp 13 |
|---|---|---|---|---|---|---|---|---|---|---|
| Extrusion Parameters | | | | | | | | | | |
| 20 RPM Head Pressure, psi | 1306 | 945 | 1108 | 1505 | 1115 | 1201 | 1156 | 1268 | 1564 | 1503 |
| 20 RPM HP/Output, psi/g/min. | 79.9 | 58.3 | 65.2 | 100.4 | 69.2 | 78.0 | 72.9 | 77.8 | 97.3 | 92.2 |
| 30 RPM Head Pressure, psi | 1501 | 1141 | 1345 | 1877 | 1357 | 1429 | 1402 | 1550 | 1903 | 1685 |
| 30 RPM HP/Output, psi/g/min. | 60.0 | 48.0 | 53.4 | 81.3 | 54.6 | 62.6 | 57.8 | 62.9 | 77.9 | 67.5 |
| 40 RPM Head Pressure, psi | 1580 | 1356 | 1551 | 2184 | 1568 | 1680 | 1625 | 1767 | 2203 | 1770 |
| 40 RPM HP/Output, psi/g/min. | 47.3 | 40.7 | 45.8 | 71.3 | 47.3 | 53.2 | 48.8 | 54.0 | 67.6 | 55.6 |
| Tensile Strength and Elongation Initial Conditions | | | | | | | | | | |
| Avg Tensile Strength, psi | 3426 | 3286 | 3325 | 3332 | 3329 | 3364 | 3282 | 3322 | 3239 | 3424 |
| Average Elongation, % | 240 | 257 | 229 | 219 | 208 | 245 | 224 | 234 | 242 | 242 |
| Average 100% Modulus | 2515 | 2340 | 2488 | 2511 | 2500 | 2454 | 2433 | 2455 | 2382 | 2467 |
| Average 200% Modulus | 3241 | 3040 | 3194 | 3241 | 3156 | 3166 | 3130 | 3162 | 3056 | 3214 |
| After aging at 121° C. | | | | | | | | | | |
| Avg Tensile Strength, psi | 3245 | 3204 | 3177 | 2952 | 3255 | 3092 | 3127 | 3099 | 2960 | 3175 |
| Average Elongation, % | 234 | 267 | 191 | 203 | 253 | 249 | 238 | 242 | 233 | 234 |
| Tensile Retention, % | 95 | 98 | 96 | 89 | 98 | 92 | 95 | 94 | 91 | 93 |
| Elongation Retention, % | 97 | 104 | 83 | 93 | 121 | 101 | 106 | 103 | 96 | 97 |

Examples 46–50

Semi-conductive shields for use in preparing electrical cables are prepared by combining approximately 48 parts by weight of an ethylene/vinyl acetate copolymer (50% vinyl acetate content), about 11.08 parts by weight of an ethylene/octene copolymer, about 37 parts by weight of one of the treated carbon blacks prepared for Examples 41–45 above, and about 3.5 parts by weight of other additives. The ethylene/vinyl acetate copolymer has a melt index of between 7 and 11. The ethylene/octene copolymer has a melt index of 31 and a density of 0.87 g/cm³. The additives include about 0.9% of a stearic acid processing aid, 0.7% of an antioxidant 1,2-dihydro-2,2,4-trimethylquinoline, 1.0% of an organic peroxide curative α,α'-bis(tert-butylperoxy)-diisopropylbenzene and 0.9% hydrotalcite. The specific component ratios are as follows:

| Component | 46 | 47 | 48 | 49 | 50 |
|---|---|---|---|---|---|
| Ethylene/vinyl acetate | 48.22 | 47.40 | 48.22 | 47.81 | 48.22 |
| Carbon Black #1 | 37.20 | — | — | — | — |
| Carbon Black #2 | — | 38.02 | — | — | — |
| Carbon Black #3 | — | — | 37.20 | — | — |
| Carbon Black #4 | — | — | — | 37.61 | — |
| Carbon Black #5 | — | — | — | — | 37.20 |
| Ethylene/octene Polymer | 11.08 | 11.08 | 11.08 | 11.08 | 11.08 |
| Antioxidant | 0.70 | 0.70 | 0.70 | 0.70 | 0.70 |
| Stearic Acid | 0.90 | 0.90 | 0.90 | 0.90 | 0.90 |
| Hydrotalcite | 0.90 | 0.90 | 0.90 | 0.90 | 0.90 |
| Peroxide Curative | 1.00 | 1.00 | 1.00 | 1.00 | 1.00 |
| Total | 100.00 | 100.00 | 100.00 | 100.00 | 100.00 |

The components are mixed in a Banbury mixer.

The same tests and measurements are conducted as in Examples 41–45, and the results are presented in Table 10. Additionally, the formulations are tested for adhesion to crosslinked polyethylene, and the results are also presented in Table 10.

Comparative Examples 14–18

Semi-conductive shields for use in preparing electrical cables are prepared similar to those in Examples 46–50 above, except that the carbon black is an untreated carbon black. That is, the carbon black pellets are derived from carbon black pelletized with deionized water.

Semi-conductive shields for use in preparing electrical cables are prepared by combining approximately 48 parts by weight of the ethylene/vinyl acetate copolymer (50% vinyl acetate content) and about 11 parts by weight of the ethylene/octene copolymer both as used in Examples 46–50, about 37 parts by weight of the untreated carbon black, and about 3.5 parts by weight of other additives. The formulation additionally includes polyethylene glycol (PEG) added directly into the formulation. In these Comparative Examples, varying amounts of differing molecular weight polyethylene glycol are added to the formulations. The specific component ratios are as follows:

| Component | Comp 14 | Comp 15 | Comp 16 | Comp 17 | Comp 18 |
|---|---|---|---|---|---|
| Carbon Black | 36.38 | 36.38 | 36.38 | 36.38 | 36.38 |
| Ethylene/vinyl acetate | 48.22 | 47.56 | 48.22 | 47.56 | 48.22 |
| 20,000 MW PEG | 0.82 | — | — | — | — |
| 20,000 MW PEG | — | 1.64 | — | — | — |
| 35,000 MW PEG | — | — | 0.82 | — | — |
| 35,000 MW PEG | — | — | — | 1.64 | — |
| 100,000 MW PEG | — | — | — | — | 0.82 |
| Ethylene/octene Polymer | 11.08 | 10.92 | 11.08 | 10.92 | 11.08 |
| Antioxidant | 0.70 | 0.70 | 0.70 | 0.70 | 0.70 |
| Stearic Acid | 0.90 | 0.90 | 0.90 | 0.90 | 0.90 |
| Hydrotalcite | 0.90 | 0.90 | 0.90 | 0.90 | 0.90 |
| Peroxide Curative | 1.00 | 1.00 | 1.00 | 1.00 | 1.00 |
| Total | 100.00 | 100.00 | 100.00 | 100.00 | 100.00 |

Here, all of the parts by weight are based on the weight of the total formulation. The components are mixed in a Banbury mixer as in Examples 46–50 above.

It is also noted here that the additives in Comparative Examples 14–18 are the same as those in Examples 46–50, and are present in the same amounts. Additionally, the amounts of polymer, carbon black and polyethylene glycol are the same in Examples 46–48 and 50, and Comparative Examples 14–16 and 18, respectively. As between Example 49 and Comparative Example 17, the difference is that the amount of polyethylene glycol used in Example 49 is 3% by weight of the carbon black (and is used to treat the carbon black), but in Comparative Example 17 4% polyethylene glycol by weight of carbon black is used as a direct additive into the formulation. Furthermore, as noted above, the polyethylene glycol in Examples 46–50 is used to treat the carbon black, whereas in Comparative Examples 14–18 it is added directly to the formulation.

The same tests and measurements are conducted as in Examples 46–50, and the results are presented in Table 10.

The additives in Comparative Example 19 are the same as those in Examples 41–45 and Comparative Examples 9–13 and are present in approximately the same amounts, except for the exclusion of the polyethylene glycol compound.

A further semi-conductive formulation is prepared as in Comparative Examples 14–18 except that the formulation contains approximately 48.9 parts by weight of the ethylene/vinyl acetate copolymer (50% vinyl acetate content) and 11.24 parts by weight of the ethylene/octene copolymer used in Examples 46–50, about 36.4 parts by weight of the untreated carbon black, and about 3.5 parts by weight of other additives. The formulation is denoted Comparative Example 20.

The additives in Comparative Example 20 are the same as those in Examples 46–50 and Comparative Examples 14–18

TABLE 10

|  | 46 | 47 | 48 | 49 | 50 | Comp 14 | Comp 15 | Comp 16 | Comp 17 | Comp 18 |
| --- | --- | --- | --- | --- | --- | --- | --- | --- | --- | --- |
| ODR Measurements at 400° F. | | | | | | | | | | |
| $M_l$, lb-in. | 6.3 | 6.3 | 6.0 | 4.7 | 6.7 | 6.3 | 6.3 | 6.7 | 6.4 | 6.3 |
| $M_h$, lb-in. | 49.7 | 40.0 | 49.3 | 40.1 | 53.0 | 46.6 | 44.3 | 45.6 | 45.1 | 46.6 |
| $t_s 2$, sec. | 49 | 48.7 | 52 | 55.7 | 49 | 43.3 | 43.6 | 52.6 | 46.3 | 47.7 |
| $t_c(50)$, sec. | 97.7 | 88 | 96 | 102 | 91 | 83.6 | 82.3 | 93.6 | 84 | 87 |
| $t_c(90)$, sec. | 140.7 | 136 | 148 | 154.7 | 141 | 125 | 123.3 | 141 | 123.3 | 129.3 |
| Adhesion to Crosslinked Polyethylene, lb/½ in. | | | | | | | | | | |
| Room Temperature | 3.89 | 4.25 | 3.47 | 3.08 | 4.45 | 5.56 | 5.2 | 5.06 | 4.11 | 8.37 |
| Volume Resistivity, ohm-cm | | | | | | | | | | |
| Room Temperature | 305 | 399 | 400 | 476 | 240 | 611 | 803 | 719 | 525 | 653 |
| 50° C. | 359 | 464 | 466 | 563 | 307 | 454 | 566 | 618 | 459 | 944 |
| 90° C. | 271 | 348 | 346 | 447 | 217 | 492 | 600 | 650 | 452 | 583 |
| 110° C. | 240 | 307 | 310 | 412 | 193 | 399 | 481 | 529 | 367 | 508 |
| 130° C. | 201 | 261 | 267 | 363 | 165 | 376 | 454 | 513 | 347 | 435 |
| Extrusion Parameters | | | | | | | | | | |
| 20 RPM Head Pressure, psi | 1718 | 1615 | 1516 | 1653 | 1515 | 1762 | 1735 | 1666 | 1669 | 1560 |
| 20 RPM HP/Output, psi/g/min. | 115.8 | 108.6 | 115.5 | 134.0 | 112.0 | 145.9 | 122.7 | 118.8 | 118.9 | 120.5 |
| 30 RPM Head Pressure, psi | 2138 | 2030 | 1895 | 2101 | 1855 | 2197 | 2050 | 2031 | 2046 | N/A |
| 30 RPM HP/Output, psi/g/min. | 90.1 | 85.7 | 92.8 | 101.1 | 89.0 | 109.8 | 100.5 | 98.6 | 93.4 | N/A |
| 40 RPM Head Pressure, psi | 2404 | 2247 | 2203 | 2381 | 2234 | 2476 | 2431 | 2279 | 2332 | 2278 |
| 40 RPM HP/Output, psi/g/min | 80.7 | 74.9 | 83.0 | 83.9 | 74.9 | 88.4 | 83.0 | 86.3 | 79.6 | 78.8 |
| Tensile Strength and Elongation Initial Conditions | | | | | | | | | | |
| Avg Tensile Strength, psi | 2134 | 2079 | 2113 | 2262 | 2179 | 2099 | 2120 | 2167 | 2066 | 2140 |
| Average Elongation, % | 245 | 240 | 239 | 236 | 243 | 263 | 277 | 269 | 251 | 268 |
| Average 100% Modulus | 1177 | 1117 | 1152 | 1269 | 1190 | 1069 | 1035 | 1078 | 1082 | 1050 |
| Average 200% Modulus | 1964 | 1909 | 1953 | 2116 | 1998 | 1867 | 1856 | 1908 | 1872 | 1883 |
| After aging at 121° C. | | | | | | | | | | |
| Avg Tensile Strength, psi | 2072 | 2065 | 2163 | 2155 | 2129 | 2066 | 1988 | 2059 | 1945 | 2084 |
| Average Elongation, % | 248 | 264 | 263 | 247 | 249 | 284 | 274 | 275 | 300 | 278 |
| Tensile Retention, % | 97 | 99 | 102 | 95 | 98 | 98 | 94 | 95 | 94 | 97 |
| Elongation Retention, % | 101 | 110 | 110 | 105 | 103 | 108 | 99 | 102 | 119 | 104 |

Comparative Examples 19–20

Further polymer compositions are prepared to compare the results obtained in the above Examples and Comparative Examples with polymer formulations not including the polyethylene glycol compound as either a pelletizing aid for treating the carbon black or as a direct additive.

A semi-conductive formulation is prepared as in Comparative Examples 9–13 except that the formulation contains approximately 58 parts by weight of an ethylene/1-butene copolymer (the same copolymer as used in Examples 41–45), about 40.5 parts by weight of the untreated carbon black, and about 1.5 parts by weight of the other additives. The formulation is denoted Comparative Example 19.

and are present in approximately the same amounts, except for the exclusion of the polyethylene glycol compound.

The components for each formulation are mixed in a Banbury mixer or other suitable equipment as in Examples 41–45 above. The formulations are then tested and measured as in Examples 41–45, and the results are presented in Table 11.

For ease of comparison, the results of Comparative Examples 9 and 14 and Examples 41 and 46 are reproduced in Table 11. Table 11 thus shows the results for the two different polymer formulations containing no polyethylene glycol (Comparative Examples 19 and 20), formulations containing polyethylene glycol in an amount of 2% by weight of carbon black as a direct additive to the formulations (Comparative Examples 9 and 14), and formulations containing polyethylene glycol in an amount of 2% by weight of carbon black as a treating agent for the carbon black (Examples 41 and 46).

TABLE 11

|  | Comp 19 | Comp 9 | 41 | Comp 20 | Comp 14 | 46 |
|---|---|---|---|---|---|---|
| ODR Measurements at 400° F. | | | | | | |
| $M_l$, lb-in. | 2.0 | 2.3 | 2.2 | 6.8 | 6.3 | 6.3 |
| $M_h$, lb-in. | 72.7 | 69.9 | 67.2 | 47.1 | 46.6 | 49.7 |
| $t_s2$, sec. | 61 | 59.7 | 55.3 | 51 | 43.3 | 49 |
| $t_c(50)$, sec. | 122 | 111 | 108.3 | 98.7 | 83.6 | 97.7 |
| $t_c(90)$, sec. | 181 | 157.7 | 160.3 | 150.7 | 125 | 140.7 |
| Adhesion to Crosslinked Polyethylene, lb/½ in. | | | | | | |
| Room Temperature | NA | NA | NA | 4.51 | 5.56 | 3.89 |
| Volume Resistivity, ohm-cm | | | | | | |
| Room Temperature | 5 | 5 | 5 | 811 | 611 | 305 |
| 50° C. | 7 | 6 | 7 | 961 | 454 | 359 |
| 90° C. | 28 | 28 | 30 | 721 | 492 | 271 |
| 110° C. | 34 | 31 | 35 | 653 | 399 | 240 |
| 130° C. | 37 | 35 | 37 | 556 | 376 | 201 |
| Viscosity and Shear Measurements | | | | | | |
| 20 RPM Head Pressure, psi | 1573 | 1201 | 1306 | 1928 | 1762 | 1718 |
| 20 RPM HP/Output, psi/g/min. | 105.8 | 78.0 | 79.9 | 156.3 | 145.9 | 115.8 |
| 30 RPM Head Pressure, psi | 2006 | 1429 | 1501 | 2290 | 2197 | 2138 |
| 30 RPM HP/Output, psi/g/min. | 86.8 | 62.6 | 60.0 | 119.1 | 109.8 | 90.1 |
| 40 RPM Head Pressure, psi | 2337 | 1680 | 1580 | 2723 | 2476 | 2404 |
| 40 RPM HP/Output, psi/g/min. | 76.3 | 53.2 | 47.3 | 99.3 | 88.4 | 80.7 |
| Tensile Strength and Elongation | | | | | | |
| Initial Conditions | | | | | | |
| Avg Tensile Strength, psi | 3324 | 3364 | 3426 | 2138 | 2099 | 2134 |
| Average Elongation, % | 231 | 245 | 240 | 254 | 263 | 245 |
| Average 100% Modulus | 2511 | 2454 | 2515 | 1254 | 1069 | 1177 |
| Average 200% Modulus | 3194 | 3166 | 3241 | 1997 | 1867 | 1964 |
| After aging at 121° C. | | | | | | |
| Avg Tensile Strength, psi | 3072 | 3092 | 3245 | 2028 | 2066 | 2072 |
| Average Elongation, % | 212 | 249 | 234 | 228 | 284 | 248 |
| Tensile Retention, % | 92 | 92 | 95 | 95 | 98 | 97 |
| Elongation Retention, % | 92 | 101 | 97 | 90 | 108 | 101 |

The foregoing embodiments are intended to illustrate and not limit the present invention. It will be apparent that various modifications can be made without departing from the spirit and scope of the invention as defined by the appended claims.

What is claimed is:

1. A polymeric formulation comprising at least one polymer and a carbon black treated with at least one polyethylene glycol having a weight average molecular weight of from about 20,000 to about 1,000,000.

2. A polymeric formulation according to claim 1, wherein said polymer is selected from the group consisting of homopolymers, copolymers and graft polymers of ethylene, elastomers of natural rubber, polybutadiene, polyisoprene, random styrene butadiene rubber, polychloroprene, nitrile rubbers, ethylene propylene copolymers and terpolymers, homopolymers and copolymers of styrene, linear and branched polyether or polyester polyols, crystalline and amorphous polyesters and polyamides, alkyd resins, hydrocarbon resins produced from thermal or Friedal Crafts polymerization of cyclic diene monomers, ethylene/silane copolymers, ethylene/α-olefin/diene terpolymers, and mixtures thereof.

3. A polymeric formulation according to claim 1, wherein said polymer is a polymer, copolymer or terpolymer containing at least a polyolefin.

4. A polymeric formulation according to claim 1, wherein said polyethylene glycol has a weight average molecular weight of from greater than 20,000 to about 100,000.

5. A polymeric formulation according to claim 1, wherein said polyethylene glycol has a weight average molecular weight of from about 35,000 to about 100,000.

6. A polymeric formulation according to claim 1, wherein said polyethylene glycol is present in an amount of from about 0.1% to about 50% by weight of said treated carbon black.

7. A polymeric formulation according to claim 1, wherein said treated carbon black is present in an amount of from about 0.1% to about 65% by weight of said formulation.

8. A polymeric formulation according to claim 1, further comprising at least one additive selected from the group consisting of crosslinking agents, vulcanizing agents, stabilizers, antioxidants, processing aids, pigments, dyes, colorants, metal deactivators, oil extenders, lubricants, and inorganic fillers.

9. A polymeric formulation according to claim 3, wherein said polymer is a copolymer of ethylene with at least one monomer selected from the group consisting of vinyl acetate, $C_1$–$C_8$ alkyl acrylates, $C_1$–$C_8$ alkyl methacrylates, and alpha olefins.

10. A polymeric formulation according to claim 9, wherein said ethylene copolymer is an ethylene/vinyl acetate copolymer containing vinyl acetate in an amount of from about 5 to about 80 mole percent.

11. A polymeric formulation according to claim 9, wherein said ethylene copolymer is ethylene copolymerized with one of methyl acrylate, ethyl acrylate or butyl acrylate.

12. A polymeric formulation according to claim 11, wherein said ethylene copolymer contains said one of methyl acrylate, ethyl acrylate or butyl acrylate in an amount of from about 5 to about 80 mole percent.

13. A polymeric formulation according to claim 9, wherein said ethylene copolymer is ethylene copolymerized with an alpha olefin selected from the group consisting of propene, butene, hexene, and octene, said ethylene copolymer containing ethylene in an amount of from about 25 to about 98 mole percent.

14. A polymeric formulation according to claim 9, wherein said formulation comprises from about 30 to about 80 parts by weight of said ethylene copolymer and from about 12 to about 50 parts by weight of said treated carbon black, based on the total weight of said formulation.

15. A polymeric formulation according to claim 14, wherein said treated carbon black is a carbon black treated with polyethylene glycol in an amount of from about 1% to about 10% by weight of said treated carbon black.

16. A polymeric formulation according to claim 14, further comprising at least one additive selected from the group consisting of crosslinking agents, vulcanizing agents, stabilizers, antioxidants, processing aids, pigments, dyes, colorants, metal deactivators, oil extenders, lubricants, and inorganic fillers.

17. A polymeric formulation according to claim 14, further comprising an ethylene/octene copolymer in an amount of from about 2% to about 30% by weight of said formulation.

18. A polymeric formulation according to claim 9, wherein said formulation comprises from about 40 to about 90 parts by weight of an ethylene alpha olefin copolymer and from about 10 to about 50 parts by weight of said treated carbon black, based on the total weight of said formulation.

19. A polymeric formulation according to claim 18, wherein said ethylene alpha olefin copolymer is an ethylene butene copolymer.

20. A polymeric formulation according to claim 18, wherein said ethylene alpha olefin copolymer is an ethylene propylene copolymer.

21. A polymeric formulation according to claim 18, wherein said treated carbon black is a carbon black treated with polyethylene glycol in an amount of from about 1% to about 10% by weight of said treated carbon black.

22. A polymeric formulation according to claim 18, further comprising at least one additive selected from the group consisting of crosslinking agents, vulcanizing agents, stabilizers, antioxidants, processing aids, pigments, dyes, colorants, metal deactivators, oil extenders, lubricants, and inorganic fillers.

23. A shield for a power cable comprising the polymeric formulation of claim 1, wherein said formulation comprises said treated carbon black in an amount sufficient to impart semi-conductive properties to said formulation.

24. A shield for a power cable comprising the polymeric formulation of claim 1, wherein said formulation comprises said treated carbon black in an amount sufficiently low so as not to impart conducting properties to said insulating material.

25. A polymeric formulation according to claim 1, wherein said polymeric formulation is prepared by a process comprising:

treating said carbon black with said polyethylene glycol to produce a treated carbon black; and mixing said treated carbon black with said at least one polymer.

26. A polymeric formulation according to claim 25, wherein said treating step comprises:

combining said carbon black with an aqueous binder solution of said polyethylene glycol; and mixing said carbon black and aqueous binder solution to form pellets of said treated carbon black.

\* \* \* \* \*